(12) United States Patent
Davidson et al.

(10) Patent No.: US 9,306,392 B2
(45) Date of Patent: *Apr. 5, 2016

(54) CONTROL CIRCUIT FOR EXCESS ENERGY REMOVAL IN POWER TRANSMISSION LINES

(71) Applicant: ALSTOM Technology Ltd, Baden (CH)

(72) Inventors: Colin Charnock Davidson, Stafford (GB); Kevin J. Dyke, Stafford (GB); Jose Maneiro, Horgues (FR); David Reginald Trainer, Derby (GB); Nnamdi Okaeme, Woodside Park (GB)

(73) Assignee: General Electric Technology GmbH, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/382,291

(22) PCT Filed: Dec. 28, 2012

(86) PCT No.: PCT/GB2012/053278
§ 371 (c)(1),
(2) Date: Aug. 29, 2014

(87) PCT Pub. No.: WO2013/128148
PCT Pub. Date: Sep. 6, 2013

(65) Prior Publication Data
US 2015/0035364 A1    Feb. 5, 2015

(30) Foreign Application Priority Data

Mar. 1, 2012   (EP) ................... PCT/EP2012/053571

(51) Int. Cl.
*H02J 1/00*      (2006.01)
*H02J 3/14*      (2006.01)
(Continued)

(52) U.S. Cl.
CPC .. *H02J 1/02* (2013.01); *H02H 3/16* (2013.01); *H02H 7/268* (2013.01); *H02J 3/36* (2013.01);
(Continued)

(58) Field of Classification Search
CPC ........... H02J 1/00; H02J 1/02; Y10T 307/445
USPC .......................................................... 307/36
See application file for complete search history.

(56) References Cited

U.S. PATENT DOCUMENTS

2008/0197966 A1   8/2008 Sommer
2011/0148198 A1   6/2011 Tripathi et al.
(Continued)

FOREIGN PATENT DOCUMENTS

EP          0 868 001        9/1998
EP          2 251 224       11/2010
(Continued)

OTHER PUBLICATIONS

International Search Report and Written Opinion for PCT Application No. PCT/GB2012/053278, mailed May 7, 2013, 9 pages.

*Primary Examiner* — Carlos Amaya
(74) *Attorney, Agent, or Firm* — Foley & Lardner LLP

(57) ABSTRACT

A control circuit comprising: first and second terminals for respective connection to first and second power transmission lines; a current transmission path extending between the first and second terminals and having first and second current transmission path portions separated by a third terminal, either or both of the first and second current transmission path portions including at least one module, the or each module including at least one energy storage device; an auxiliary terminal for connection to ground or the second power transmission line; an energy conversion block for removing energy from the power transmission lines, the energy conversion block extending between the third and auxiliary terminals such that the energy conversion block branches from the current transmission path, the energy conversion block including at least one energy conversion element; and a control unit which selectively removes the or each energy storage device from the current transmission path.

18 Claims, 11 Drawing Sheets

(51) Int. Cl.
  *H02J 1/02* (2006.01)
  *H02H 7/26* (2006.01)
  *H02J 3/36* (2006.01)
  *H02H 3/16* (2006.01)
  *H02J 4/00* (2006.01)
  *H02H 9/04* (2006.01)
  *H02M 7/483* (2007.01)
  *H02M 1/32* (2007.01)

(52) U.S. Cl.
  CPC . *H02J 4/00* (2013.01); *H02H 9/041* (2013.01); *H02J 2003/365* (2013.01); *H02M 1/32* (2013.01); *H02M 2007/4835* (2013.01); *Y02E 60/60* (2013.01); *Y10T 307/445* (2015.04)

(56) References Cited

U.S. PATENT DOCUMENTS

| | | |
|---|---|---|
| 2011/0163544 A1 | 7/2011 | Gupta et al. |
| 2011/0205768 A1 | 8/2011 | Svensson |
| 2011/0222320 A1 | 9/2011 | Delmerico et al. |
| 2015/0009594 A1* | 1/2015 | Okaeme et al. ............ 361/42 |

FOREIGN PATENT DOCUMENTS

| | | |
|---|---|---|
| EP | 2 750 271 | 7/2014 |
| WO | WO-2011/127980 | 10/2011 |
| WO | WO-2012/025142 A1 | 3/2012 |
| WO | WO-2013/000518 A1 | 1/2013 |
| WO | WO-2013/068031 A1 | 5/2013 |
| WO | WO-2013/127461 A1 | 9/2013 |

* cited by examiner

CONTROL CIRCUIT FOR EXCESS ENERGY REMOVAL IN POWER TRANSMISSION LINES

CROSS-REFERENCE TO RELATED APPLICATIONS

This application is a National Stage of International Application No. PCT/GB2012/053278, filed Dec. 28, 2012, which claims priority to International Application No. PCT/EP2012/053571, filed Mar. 1, 2012.

BACKGROUND

This invention relates to a control circuit.

In DC power transmission schemes, DC transmission lines are used to interconnect a transmitting electrical network and a receiving electrical network to permit transfer of power between two electrical networks. In the event of a fault preventing the receiving electrical network from receiving power from the DC transmission lines, the transmitting electrical network cannot interrupt the transmission of power into the DC transmission lines. This is because generators, such as wind turbines, cannot be switched off instantaneously and so will continue to feed energy into the DC transmission lines. Moreover, the receiving electrical network is required by a Grid Code to ride through a supply dip, e.g. where the voltage is reduced to approximately 15% of its original value, and to resume the transmission of power upon the removal of the fault.

Continuing to transmit power into the DC transmission lines results in an accumulation of excess power in the DC transmission lines which not only adversely affects the balance between the transmission and receipt of power by the respective electrical networks, but also might damage various components of the DC power transmission scheme, particularly as a result of high voltage stress caused by uncontrolled charging of the capacitance of the DC transmission lines.

One solution for preventing the accumulation of excess power is to temporarily store the excess power in DC link capacitors and other capacitors forming part of the transmitting electrical network. The finite energy storage capability of the transmitting electrical network however limits the amount of real power that may be temporarily stored away until the receiving electrical network returns to its working state.

Another solution for preventing the accumulation of excess power is the use of a load dump chopper circuit to divert the excess power away from the DC transmission lines. A dump resistor may be connected in series with a switch across the DC transmission lines. Closing the switch causes current to flow from the DC transmission lines through the dump resistor, which in turn causes power to dissipate via the dump resistor. This allows excess energy to be removed from the DC transmission lines via the load dump chopper circuit.

Existing chopper circuits utilise a simple semiconductor switch to connect a resistor between the DC transmission lines in order to absorb excess energy. This type of chopper relies on the series connection and simultaneous switching of a large number of lower voltage semiconductor switches which are operated in a pulse width modulation (PWM) manner to accurately control the energy absorption. The design and operation of such a chopper circuit switch requires large passive devices and complex control methods to ensure equal sharing of the total applied voltage between the individual semiconductor switches. In addition, the PWM action leads to very high rates of change of voltage and current within the chopper circuit and DC transmission lines which leads to undesirable electrical spikes and a high level of electromagnetic noise and interference.

SUMMARY

According to an aspect of the invention, there is provided a control circuit comprising:
- first and second terminals for respective connection to first and second power transmission lines; and
- a current transmission path extending between the first and second terminals and having first and second current transmission path portions separated by a third terminal, either or both of the first and second current transmission path portions including at least one module, the or each module including at least one energy storage device;
- an auxiliary terminal for connection to ground or the second power transmission line;
- an energy conversion block for removing energy from the power transmission lines, the energy conversion block extending between the third and auxiliary terminals such that the energy conversion block branches from the current transmission path, the energy conversion block including at least one energy conversion element; and
- a control unit which selectively removes each energy storage device from the current transmission path.

The configuration of the control circuit in this manner allows it to be used as an energy removal device to remove excess energy from the power transmission lines in order to, for example, protect the lines from an overvoltage and to ensure a low voltage fault ride-through, if necessary. This is because the inclusion of the or each module in the control circuit permits active modification of the current flowing in the or each energy conversion element to correspond to the excess energy to be removed from the power transmission lines.

To regulate the energy levels in the power transmission lines, the control circuit in its normal operation may be configured to adopt a standby configuration in which the or each energy storage device is inserted into the current transmission path to block current from flowing in the current transmission path during normal conditions of the power transmission lines, or to selectively remove one or more energy storage devices from the current transmission path to cause current to flow from the power transmission lines through the current transmission path and into the or each energy conversion element so as to enable excess energy to be removed from the DC transmission lines and dissipated via the or each energy conversion element.

The ability to selectively remove the or each energy storage device from the current transmission path has been found to allow a fast transfer of energy, i.e. excess power, from the power transmission lines to the control circuit and thereby enables rapid regulation of the energy levels in the power transmission lines. This in turn permits the control circuit to respond quickly to a requirement to regulate energy levels in the power transmission lines in the event of a fault in an associated electrical network.

The configuration of the control circuit in this manner, namely the arrangement of the energy conversion block with respect to the current transmission path, permits current in the energy conversion block to be blocked or minimised when the control circuit is not required to remove energy from the power transmission lines. When the control circuit is required to remove energy from the power transmission lines, either or both of the first and second current transmission path portions may then be configured to allow current to flow through the energy conversion block in order to enable removal of energy from the power transmission lines.

Configuration of the control circuit to connect the auxiliary terminal to the second power transmission line allows the energy conversion block to be connected to the second power transmission line, rather than ground, and thereby allows high currents to circulate through the power transmission lines instead of the stray capacitance of the power transmission lines.

It will be understood that the reference to "power transmission lines" in the invention covers both AC and DC power transmission lines.

In embodiments of the invention, the first current transmission path portion may include at least one first module, the or each first module including at least one first energy storage device.

At least one first module may further include at least one primary switching element to selectively direct current through the or each first energy storage device or cause current to bypass the or each first energy storage device. The construction of each first module in this manner allows its primary switching element(s) to be powered by its energy storage device(s), instead of an external power source, thus resulting a more compact control circuit.

The or each first module may be configured to have bidirectional current capability, i.e. the or each first module may be configured to be capable of conducting current in two directions. As an example, at least one first module may include a pair of primary switching elements connected in parallel with an energy storage device in a half-bridge arrangement to define a 2-quadrant unipolar module that can provide zero or positive voltage and can conduct current in two directions. As another example, at least one first module may include two pairs of primary switching elements connected in parallel with a first energy storage device to define a 4-quadrant bipolar module that can provide zero, positive or negative voltage and can conduct current in two directions.

The use of modules with bidirectional voltage capability in the control circuit enables combination of the control circuit with a LCC HVDC scheme in which the polarity of the DC voltage changes when the direction of the transmitted power is inverted.

Alternatively the or each first module may be configured to have unidirectional current capability, i.e. the or each first module may be configured to be capable of conducting current in only one direction. As an example, at least one first module may include first and second sets of series-connected current flow control elements, each set of current flow control elements including an active switching element to selectively direct current through the or each first energy storage device and a passive current check element to limit current flow through the first module to a single direction, the first and second sets of series-connected current flow control elements and the or each first energy storage device being arranged in a full-bridge arrangement to define a 2-quadrant bipolar rationalised module that can provide zero, positive or negative voltage while conducting current in a single direction.

Such first modules provide a reliable means of selectively removing the or each first energy storage device from the current transmission path.

In embodiments of the invention, the second current transmission path portion may include at least one primary switching block which is switchable to selectively permit or inhibit flow of current in the second transmission path portion.

At least one primary switching block may include at least one secondary switching element. The number of secondary switching elements in the second current transmission path portion may vary depending on the required voltage rating of the second current transmission path portion.

At least one primary switching block may include a second module, the second module including at least one second energy storage device. At least one second module may include at least one primary switching element to selectively direct current through the or each second energy storage device or cause current to bypass the or each second energy storage device. As indicated above with respect to the first modules, the construction of the or each second module in this manner allows its primary switching element(s) to be powered by its energy storage device(s), instead of an external power source, thus resulting a more compact control circuit.

The or each second module may be configured to have bidirectional or unidirectional current capability in the same manner as the or each first module as set out above. Such second modules provide a reliable means of selectively removing the or each second energy storage device from the second current transmission path portion in order to switch the or each primary switching block.

In embodiments of the invention in which the auxiliary terminal is for connection to the second power transmission line, the control circuit may be configured to block or minimise current flowing through the second current transmission path portion during removal of energy from the power transmission lines in order to increase the current flowing through the energy conversion block and thereby improve the efficiency of the control circuit in removing energy from the DC power transmission lines. More particularly, the control unit may selectively switch the or each primary switching block to block or minimise current flowing through the second current transmission path portion and thereby cause current to be directed into the or each energy conversion element.

When at least one primary switching block includes at least one secondary switching element, the control unit may selectively switch the or each secondary switching element to an off-state to block current flowing through the second current transmission path portion and thereby cause current to be directed into the or each energy conversion element.

When at least one primary switching block includes a second module, the control unit may selectively switch the or each switching element in the or each second module of the second current transmission path portion to block or minimise current flowing through the second current transmission path portion and thereby cause current to be directed into the or each energy conversion element.

For embodiments employing the use of at least one first module and at least one primary switching block, the capability of the first current transmission path portion to modulate both voltage and current allows soft-switching of the or each primary switching block of the second current transmission path portion under zero-voltage and zero-current conditions.

The configuration of the control circuit to connect the auxiliary terminal to the second power transmission line and its operation results in the second current transmission path portion conducting a zero or near-zero current during removal of energy from the power transmission lines. This thereby allows the use of low current, high voltage semiconductor devices in the second current transmission path portion.

In embodiments of the invention in which the auxiliary terminal is for connection to ground, the control circuit may be configured to cause current to flow through the current transmission path and the or each energy conversion element as follows.

When each of the first and second current transmission path portions include at least one module, the control unit may selectively remove each energy storage device from the first and second current transmission path portions to generate an AC voltage (alternating voltage) waveform across the or each energy conversion element to remove energy from the power transmission lines.

Optionally the control unit may selectively remove each energy storage device from the first and second current transmission path portions to generate a square voltage waveform, e.g. a 180° phase shifted square voltage waveform, across each of the first and second current transmission path portions and thereby generate an AC voltage waveform across the or each energy conversion element to remove energy from the power transmission lines. Generation of such a square voltage waveform across each of the first and second current transmission path portions during removal of energy from the power transmission lines has been found to not only reduce the peak values of the current flowing through the modules, but also permit energy balance between multiple modules of each current transmission path portion. It will be appreciated that the control unit may selectively remove each energy storage device from the first and second current transmission path portions so as to generate a differently-shaped voltage waveform across each of the first and second current transmission path portions during removal of energy from the power transmission lines.

In embodiments of the invention employing the use of the energy conversion block, the energy conversion block may further include at least one auxiliary switching block which is switchable to selectively permit or inhibit flow of current in the or each energy conversion element.

In such a control circuit, selective removal of the or each energy storage device from the current transmission path is not essential to control the removal of energy from the power transmission lines. Instead switching of the or each auxiliary switching block controls the flow of current in the or each energy conversion block and thereby the removal of energy from the power transmission lines in the energy removal mode. The use of at least one auxiliary switching block in the energy conversion block therefore permits optimisation of the structure of the current transmission path in relation to its use to block current in the standby configuration, thus providing savings in terms of hardware footprint and cost and improvements in terms of operational efficiency of the control circuit.

At least one auxiliary switching block may include at least one auxiliary switching element.

At least one auxiliary switching block may include an auxiliary module, the auxiliary module including at least one auxiliary energy storage device. At least one auxiliary module may include at least one auxiliary switching element to selectively direct current through the or each auxiliary energy storage device or cause current to bypass the or each auxiliary energy storage device.

Such auxiliary modules may be controlled to actively modify the current flowing in the or each energy conversion element to correspond to the excess energy to be removed from the power transmission lines.

Optionally at least one auxiliary module may be configured to have bidirectional or unidirectional current capability in the same manner as the first and second modules as set out above.

In embodiments of the invention employing the use of at least one auxiliary switching block and at least one second energy storage device, the control unit may selectively remove each second energy storage device from the second current transmission path portion to modify the voltage at the third terminal to allow soft-switching of the or each auxiliary switching block when the or each auxiliary switching block is switched, thus minimising switching losses.

BRIEF DESCRIPTION OF THE DRAWINGS

Preferred embodiments of the invention will not be described, by way of non-limiting examples, with reference to the accompanying drawings in which.

DETAILED DESCRIPTION

Figure 2:
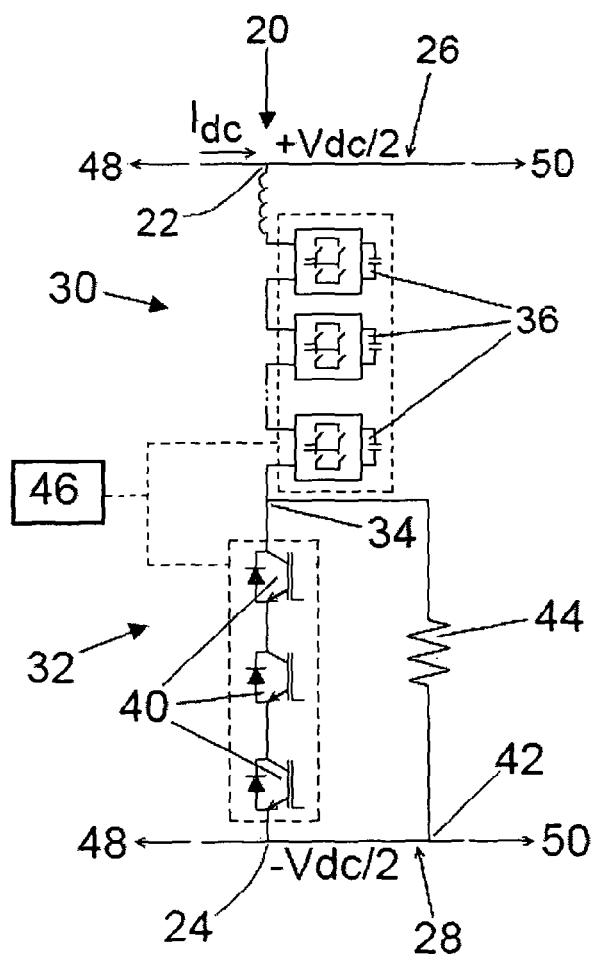
FIG. 2 shows, in schematic form, a control circuit according to a first embodiment of the invention.

A first control circuit 20 according to a first embodiment of the invention is shown in FIG. 2.

The first control circuit 20 comprises first and second terminals 22,24. In use, the first and second terminals 22,24 are respectively connected to first and second DC power transmission lines 26,28 respectively carrying a voltage of +Vdc/2 and −Vdc/2.

The first control circuit 20 further includes a current transmission path extending between the first and second terminals 22,24. The current transmission path has first and second current transmission path portions 30,32 separated by a third terminal 34.

The first current transmission path portion 30 extends between the first and third terminals 22,34, and includes a plurality of series-connected first modules 36. Each first module 36 includes two pairs of primary switching elements connected in parallel with an energy storage device in the form of a first capacitor. The pairs of primary switching elements and the first capacitor are connected in a full-bridge arrangement to define a 4-quadrant bipolar module that can provide zero, negative or positive voltage and can conduct current in two directions.

The second current transmission path portion 32 extends between the second and third terminals 24,34, and includes a plurality of series-connected secondary switching elements 40.

Each switching element is constituted by a semiconductor device in the form of an Insulated Gate Bipolar Transistor (IGBT). Each switching element also includes an anti-parallel diode connected in parallel therewith.

The first control circuit 20 further includes an auxiliary terminal 42 and an energy conversion block extending between the third and auxiliary terminals 34,42 such that the energy conversion block branches from the current transmission path. The energy conversion block includes a dump resistor 44 connected in series between the third and auxiliary terminals 34,42. It is envisaged that, in other embodiments of the invention, the dump resistor 44 may be replaced by a plurality of dump resistors.

In use, the auxiliary terminal 42 is connected to the second DC power transmission line 28.

The first control circuit 20 further includes a control unit 46 to control the selective removal of each first capacitor from the first current transmission path portion 30. Each first capacitor is selectively removable from the first current transmission path portion 30 as follows.

The first capacitor of each 4-quadrant bipolar module is selectively bypassed or inserted into the current transmission path by changing the states of the primary switching elements. This selectively directs current through the first capacitor or causes current to bypass the first capacitor, so that each 4-quadrant bipolar module provides a zero, negative or positive voltage.

The first capacitor of each 4-quadrant bipolar module is bypassed when the pairs of primary switching elements in each 4-quadrant bipolar module are configured to form a short circuit in the 4-quadrant bipolar module. This causes current in the first current transmission path portion 30 to pass through the short circuit and bypass the first capacitor, and so the 4-quadrant bipolar module provides a zero voltage, i.e. the 4-quadrant bipolar module is configured in a bypassed mode and thereby removed from the first current transmission path portion 30.

The first capacitor of each 4-quadrant bipolar module is inserted into the first current transmission path portion 30 when the pairs of primary switching elements in each 4-quadrant bipolar module are configured to allow the current in the first current transmission path portion 30 to flow into and out of the first capacitor. The first capacitor then charges or discharges its stored energy so as to provide a non-zero voltage, i.e. the 4-quadrant bipolar module is configured in a non-bypassed mode and thereby not removed from the first current transmission path portion 30. The bidirectional nature of the 4-quadrant bipolar module means that the first capacitor may be inserted into the first current transmission path portion 30 in either forward or reverse directions so as to provide a positive or negative voltage.

It is possible to build up a combined voltage across the plurality of first modules 36, which is higher than the voltage available from each of the individual first modules 36, via the insertion of the first capacitors of multiple first modules 36, each providing its own voltage, into the first current transmission path portion 30. In this manner switching of the primary switching elements of each first module 36 causes the plurality of first modules 36 to provide a stepped variable voltage source, which permits the generation of a voltage waveform across the plurality of first modules 36 using a step-wise approximation.

It is envisaged that, in other embodiments of the invention, each first module may be configured in other ways to have bidirectional current capability. For example, each first module may include a pair of primary switching elements connected in parallel with a first capacitor in a half-bridge arrangement to define a 2-quadrant unipolar module that can provide zero or positive voltage and can conduct current in two directions.

The control unit 46 also controls the switching of the plurality of secondary switching elements 40.

Figure 3:
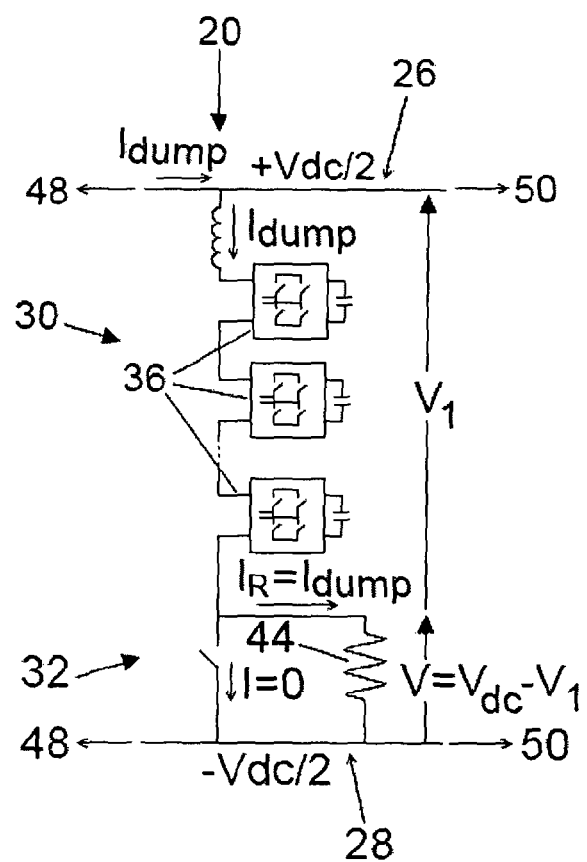
FIG. 3 illustrates the operation of the control circuit of FIG. 2.

Operation of the first control circuit 20 within a DC power transmission scheme is described as follows with reference to FIG. 3.

The first and second DC power transmission lines 26,28 interconnect first and second power converters 48,50 that are themselves connected to respective phases of corresponding first and second AC networks (not shown). Power is transmitted from the first AC network to the second AC network via the corresponding power converters and the first and second DC power transmission lines 26,28.

During normal operation the first control circuit 20 adopts a standby configuration in which the first capacitor of each first module 36 is connected in the current transmission path. Meanwhile the control unit 46 switches each secondary switching element 40 to an on-state to allow current to flow through the second current transmission path portion 32 and thereby bypass the dump resistor 44. In other words, the second current transmission path portion 32 is configured to "short" the dump resistor 44 out of circuit, and is maintained in that state while the first control circuit 20 is in the standby configuration. The purpose of configuring the second current transmission path portion 32 in this manner is to minimise power losses through energy dissipation via the dump resistor 44.

The total voltage across the first current transmission path portion 30 is approximately equal to VDC, which is the voltage across the DC power transmission lines 26,28. In the standby configuration there is zero or minimal current flowing through the current transmission path.

In the event that the second power converter 50 is unable to receive the transmitted power as a result of, for example, a fault in the second AC network, the first AC network must temporarily continue transmitting power into the DC transmission lines until the power transfer can be reduced to zero, which is typically 1-2 seconds for a wind generation plant. This may lead to accumulation of excess energy in the DC power transmission lines 26,28. Removal of the excess energy from the DC power transmission lines 26,28 is required In order to protect the DC power transmission lines 26,28 from an overvoltage and to ensure a low voltage fault ride-through, if necessary.

In order to allow the first AC network to continue transmitting power into the DC transmission lines via the first power converter 48, the control unit 46 selectively switches each secondary switching element 40 to an off-state to block current flowing through the second current transmission path portion 32 and thereby cause current to be directed into the dump resistor 44. Meanwhile the control unit 46 selectively removes each first capacitor from the first current transmission path portion 30 to generate a voltage waveform V1 across the first current transmission path portion 30, which adds or subtracts finite voltage steps to the voltage across the DC transmission lines, VDC. This causes current Idump to flow from the DC power transmission lines 26,28 through the first current transmission path portion 30 and into the dump resistor 44, and thereby permits energy dissipation via the dump resistor 44 so as to remove excess energy from the DC power transmission lines 26,28.

In the energy removal mode, the first control circuit 20 draws a relatively high current (typically 1.0 per unit) from the DC power transmission lines 26,28 and exchanges real power with the DC power transmission lines 26,28.

In this manner the first control circuit 20 can be used as an energy removal device to remove excess energy from the DC power transmission lines 26,28.

The inclusion of a plurality of first modules 36 in the first control circuit 20 permits generation of a wide range of voltage waveforms to actively modify the current flowing through the dump resistor 44 so as to correspond to the excess energy to be removed from the DC power transmission lines 26,28.

The ability to selectively remove each first capacitor from the current transmission path has been found to allow a fast transfer of energy, i.e. excess power, from the DC power transmission lines 26,28 to the first control circuit 20 and thereby enables rapid regulation of the energy levels in the DC power transmission lines 26,28. This in turn permits the first control circuit 20 to respond quickly to a requirement to regulate energy levels in the DC power transmission lines 26,28 in the event of a fault in an associated electrical network.

Furthermore the connection of the auxiliary terminal 42 to the second DC power transmission line 28 in turn allows the dump resistor 44 to be connected to the second DC power transmission line 28, rather than ground, and thereby allows high currents to circulate through the DC power transmission lines 26,28 instead of the stray capacitance of the DC power transmission lines 26,28.

It will be appreciated that the second current transmission path portion 32 conducts a zero or near-zero current in the standby configuration and the energy removal mode. This thereby allows the use of low current, high voltage semiconductor devices in the second current transmission path portion 32, thus providing reductions in terms of losses, cost and footprint.

Figure 1A:
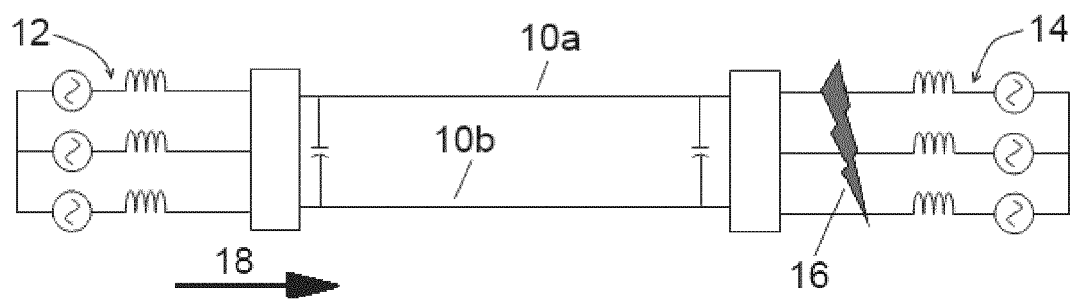
FIGS. 1a and 1b show, in schematic form, prior art DC transmission schemes.
Figure 1B:
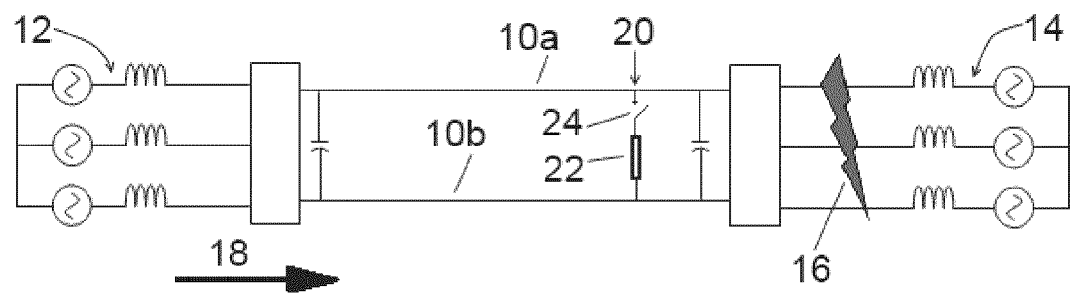
Figure 4:
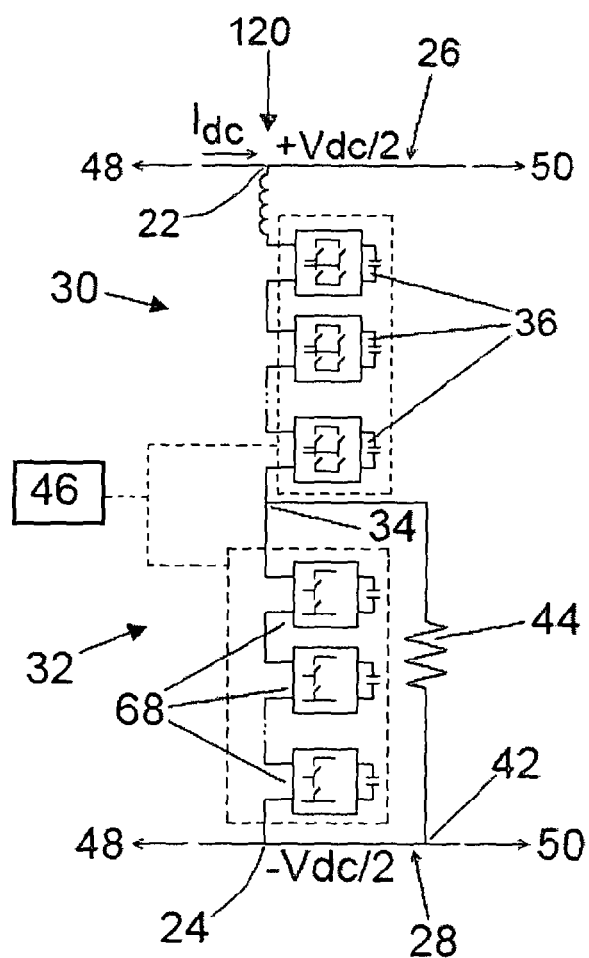
FIG. 4 shows, in schematic form, a control circuit according to a second embodiment of the invention.

A second control circuit 120 according to a second embodiment of the invention is shown in FIG. 4. The second control circuit 120 shown in FIG. 4 is similar in structure and operation to the first control circuit 20 shown in FIG. 1, and like features share the same reference numerals.

The second control circuit 120 differs from the first control circuit 20 in that, in the second control circuit 120, the plurality of series-connected secondary switching elements 40 is replaced by a plurality of series-connected second modules 68. Each second module 68 includes a pair of primary switching elements connected in parallel with an energy storage device in the form of a second capacitor. The pair of primary switching elements and the second capacitor are connected in a half-bridge arrangement to define a 2-quadrant unipolar module that can provide zero or positive voltage and can conduct current in two directions.

In use, the control unit 46 controls the selective removal of each second capacitor from the second current transmission path portion 32. Each second capacitor is selectively removable from the second current transmission path portion 32 as follows.

The second capacitor of each 2-quadrant unipolar module is selectively bypassed or inserted into the current transmission path by changing the states of the primary switching elements. This selectively directs current through the second capacitor or causes current to bypass the second capacitor, so that each 2-quadrant unipolar module provides a zero or positive voltage.

The second capacitor of each 2-quadrant unipolar module is bypassed when the pair of primary switching elements in each 2-quadrant unipolar module is configured to form a short circuit in the 2-quadrant unipolar module. This causes current in the second current transmission path portion 32 to pass through the short circuit and bypass the second capacitor, and so the 2-quadrant unipolar module provides a zero voltage, i.e. the 2-quadrant unipolar module is configured in a bypassed mode and thereby removed from the second current transmission path portion 32.

The second capacitor of each 2-quadrant unipolar module is inserted into the second current transmission path portion 32 when the pair of primary switching elements in each 2-quadrant unipolar module is configured to allow the current in the second current transmission path portion 32 to flow into and out of the second capacitor. The second capacitor then charges or discharges its stored energy so as to provide a non-zero voltage, i.e. the 2-quadrant unipolar module is configured in a non-bypassed mode and thereby not removed from the second current transmission path portion 32.

It is possible to build up a combined voltage across the plurality of second modules 68 in the same manner as described above with respect to the plurality of first modules 36.

The operation of the second control circuit 120 is similar to the operation of the first control circuit 20, except that:

when removing energy from the DC power transmission lines 26,28, the control unit 46 selectively switches the states of the primary switching elements of each second module 68 of the second current transmission path portion 32 to block or minimise current flowing through the second current transmission path portion 32 and thereby cause current to be directed into the dump resistor 44.

Preferably the second control circuit 120 should be controlled so that the current flowing through the second current transmission path portion 32 is zero during removal of energy from the DC power transmission lines 26,28. However, in practice, some current will flow through the second current transmission path portion 32 to enable charging and discharging of the second capacitors to achieve a desired voltage across the dump resistor 44.

It will be appreciated that each of the plurality of second modules 68 can be configured to have a lower rating than each of the plurality of first modules 36 so as to provide reductions in terms of losses, cost and footprint. This is because, as also set out above with respect to the first control circuit 20, the second current transmission path portion 32 conducts a zero or near-zero current in the standby configuration and the energy removal mode.

Figure 5:
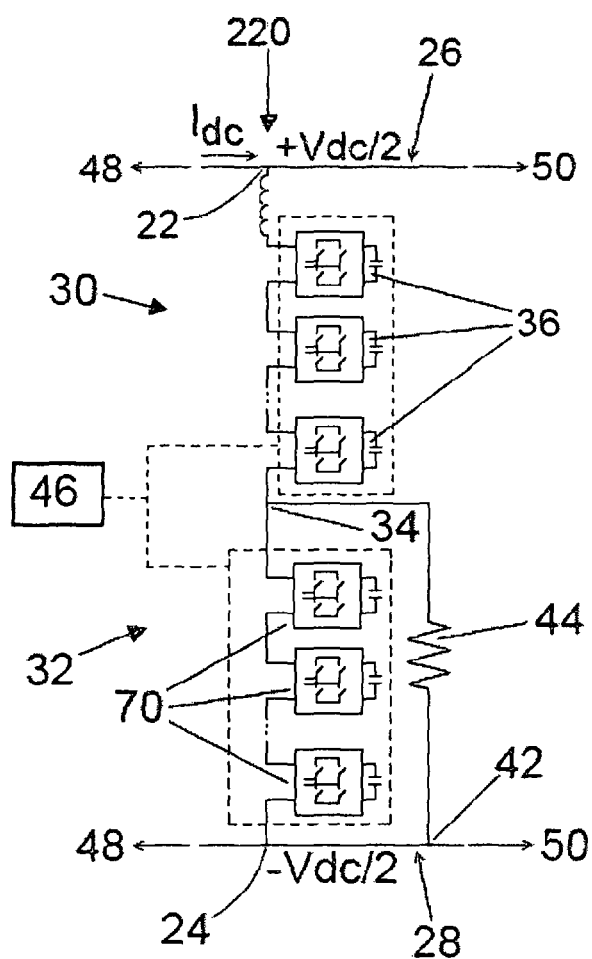
FIG. 5 shows, in schematic form, a control circuit according to a third embodiment of the invention.

A third control circuit 220 according to a third embodiment of the invention is shown in FIG. 5. The third control circuit 220 shown in FIG. 5 is similar in structure and operation to the second control circuit 120 shown in FIG. 4, and like features share the same reference numerals.

The third control circuit 220 differs from the second control circuit 120 in that, in the third control circuit 220, each second module 70 includes two pairs of primary switching elements connected in parallel with an energy storage device in the form of a second capacitor. The pairs of primary switching elements and the second capacitor are connected in a full-bridge arrangement to define a 4-quadrant bipolar module that can provide zero, negative or positive voltage and can conduct current in two directions.

In use, the control unit 46 controls the selective removal of each second capacitor from the second current transmission path portion 32. Each second capacitor is selectively removable from the second current transmission path portion 32 in the same manner as the selective removal of each first module 36 from the first current transmission path portion 30 in the first control circuit 20.

Other than the use of 4-quadrant bipolar modules in place of 2-quadrant unipolar modules in the second current transmission path portion 32, the operation of the third control circuit 220 is similar to the operation of the second control circuit 120.

The use of the 4-quadrant bipolar modules in the second current transmission path portion 32 is beneficial in that it permits use of the third control circuit 220 in combination with a LCC HVDC scheme in which the polarity of the DC voltage changes when the direction of the transmitted power is inverted.

Figure 6:
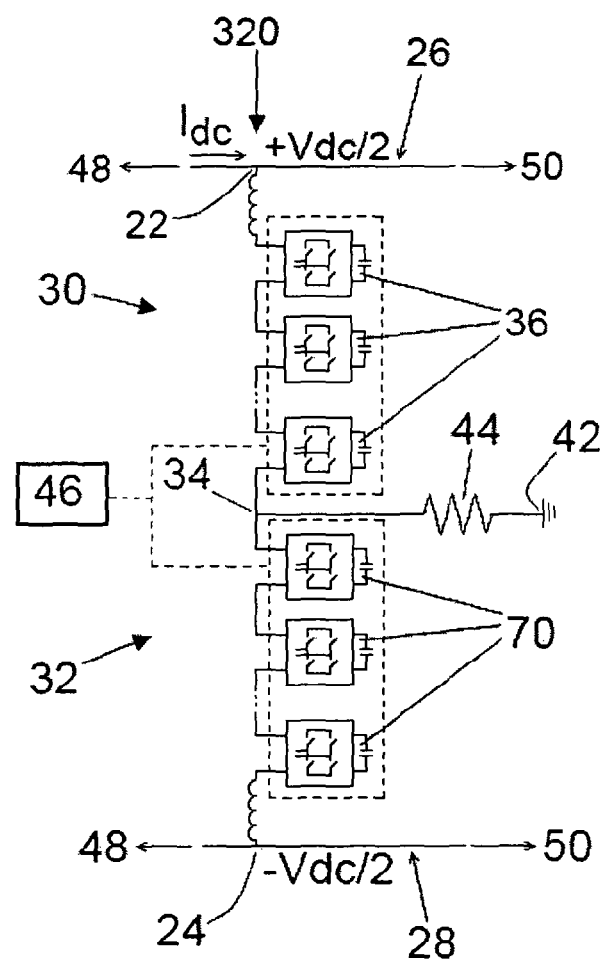
FIG. 6 shows, in schematic form, a control circuit according to a fourth embodiment of the invention.

A fourth control circuit 320 according to a fourth embodiment of the invention is shown in FIG. 6. The fourth control circuit 320 shown in FIG. 6 is similar in structure and operation to the third control circuit 220 shown in FIG. 5, and like features share the same reference numerals.

The fourth control circuit 320 differs from the third control circuit 220 in that:
  in use, the auxiliary terminal 42 is connected to ground, instead of the second DC power transmission line 28;
  the second current transmission path portion 32 further includes a second inductor connected in series with the plurality of second modules 70.

Figure 7:
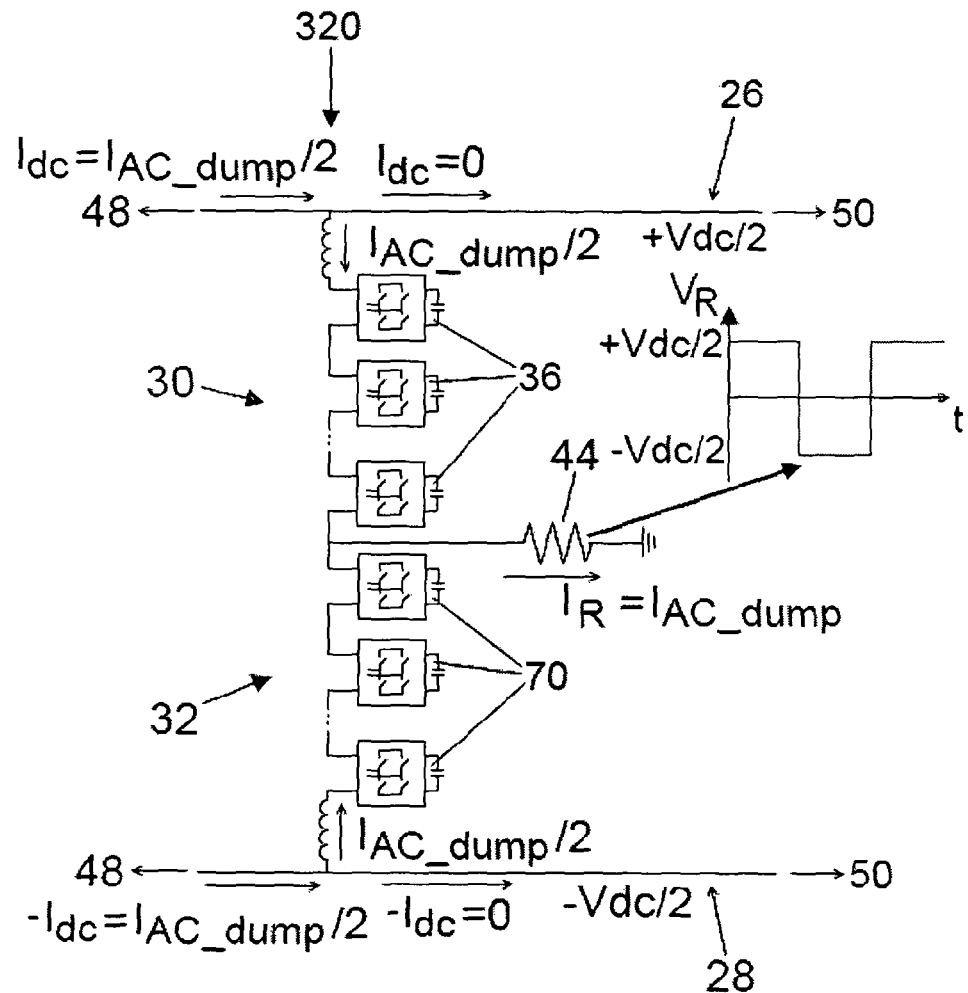
FIG. 7 illustrates the operation of the control circuit of FIG. 6.

Operation of the fourth control circuit 320 within a DC power transmission scheme is described as follows with reference to FIG. 7.

The first and second DC power transmission lines 26,28 interconnect first and second power converters 48,50 that are themselves connected to respective phases of corresponding first and second AC networks (not shown). Power is transmitted from the first AC network to the second AC network via the corresponding power converters and the first and second DC power transmission lines 26,28.

During normal operation the fourth control circuit 320 adopts a standby configuration in which the capacitors of the first and second modules 70 are connected in the current transmission path. Meanwhile the first and second current transmission path portions 30,32 are configured to maintain a zero or near-zero voltage across the dump resistor 44 in order to block or minimise current flowing through the dump resistor 44 and thereby minimise dissipation of energy via the dump resistor 44 when the fourth control circuit 320 is in the standby configuration. The purpose of configuring the first and second current transmission path portions 30,32 in this manner is to minimise power losses through energy dissipation via the dump resistor 44.

The total voltage across the first current transmission path portion 30 is approximately equal to VDC, which is the voltage across the DC power transmission lines 26,28. In the standby configuration there is zero or minimal current flowing through the current transmission path.

In the event that the second power converter 50 is unable to receive the transmitted power as a result of, for example, a fault in the second AC network, the first AC network must temporarily continue transmitting power into the DC transmission lines until the power transfer can be reduced to zero, which is typically 1-2 seconds for a wind generation plant. As indicated above, this may lead to accumulation of excess energy in the DC power transmission lines 26,28. Removal of the excess energy from the DC power transmission lines 26,28 is required in order to protect the DC power transmission lines 26,28 from an overvoltage and to ensure a low voltage fault ride-through, if necessary.

In order to allow the first AC network to continue transmitting power into the DC transmission lines via the first power converter 48, the control unit 46 selectively removes each of the first and second capacitors from the first and second current transmission path portions 30,32 to generate a voltage waveform across each of the first and second current transmission path portions 30,32, which adds or subtracts finite voltage steps to the voltage across the DC transmission lines, VDC. The voltage waveforms across the first and second current transmission path portions 30,32 are shaped so as to generate an AC voltage waveform across the dump resistor 44. This causes current IAC_dump/2 to flow from the DC power transmission lines 26,28 through the first and second current transmission path portions 30,32 and a current IAC_dump to flow into the dump resistor 44, thereby permitting energy dissipation via the dump resistor 44 so as to remove excess energy from the DC power transmission lines 26,28.

Figure 8:
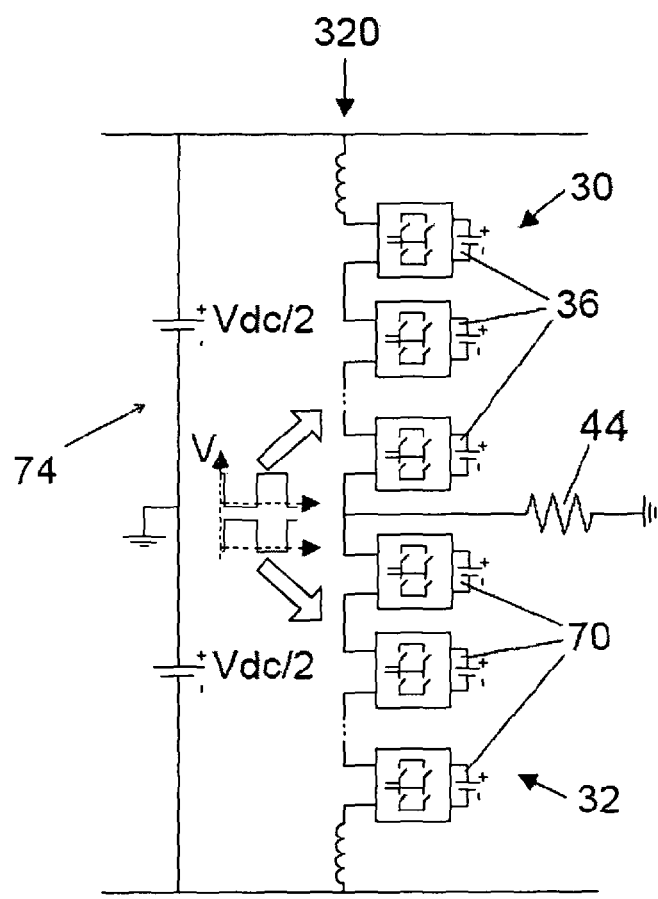
FIG. 8 shows, in schematic form, a simulation model of the control circuit of FIG. 6 for Matlab-Simulink simulation.

A simulation model of the fourth control circuit 320 has been implemented using Matlab-Simulink to illustrate its operation. A representation of the simulation model is shown in FIG. 8 in which each of the first and second capacitors are modelled as a DC voltage source and the fourth control circuit 320 is connected in parallel with a DC voltage source.

Figure 9A:
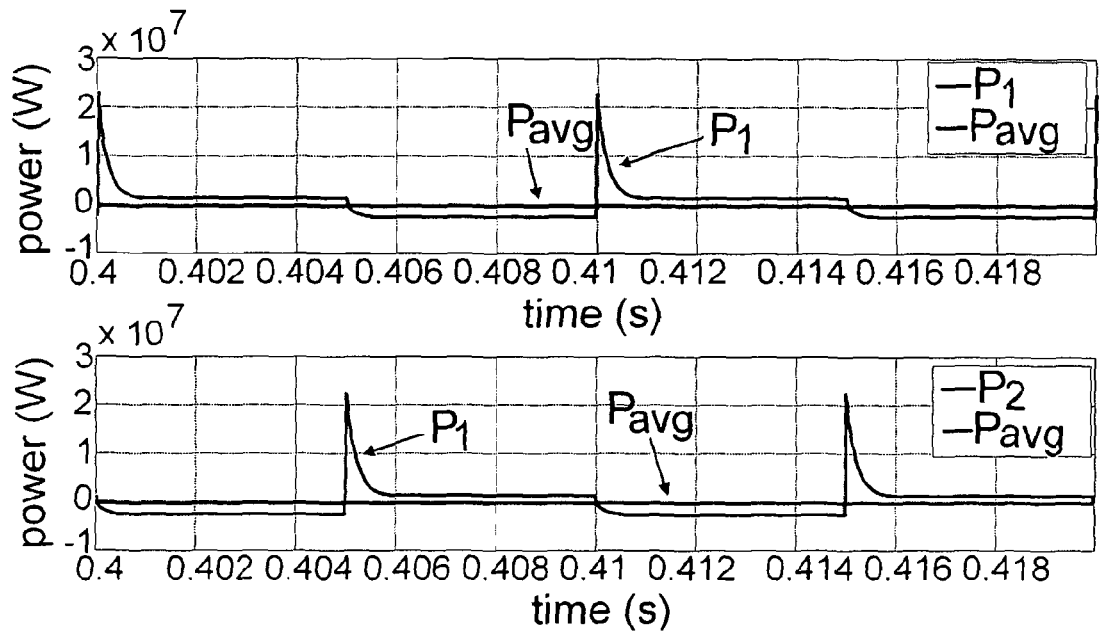
FIGS. 9a to 9c illustrate, in graph form, the results of the simulation model of FIG. 8.

A square voltage waveform demand is set for each of the first and second current transmission path portions 30,32. The positive peak of each square voltage waveform demand for each of the first and second current transmission path portions 30,32 is set to Vdc, while the negative peak of each square voltage waveform demand for each of the first and second current transmission path portions 30,32 is a negative voltage value controlled by a proportional-integral regulator so as to restore any lost energy in the first and second capacitors with a view to achieving a zero net energy exchange over a single cycle, as shown in FIG. 9a which illustrates, in graph form, the change in power P1 across the plurality of first modules 36 and a zero net power exchange indicated by a nil average power Pavg.

Figure 9B:
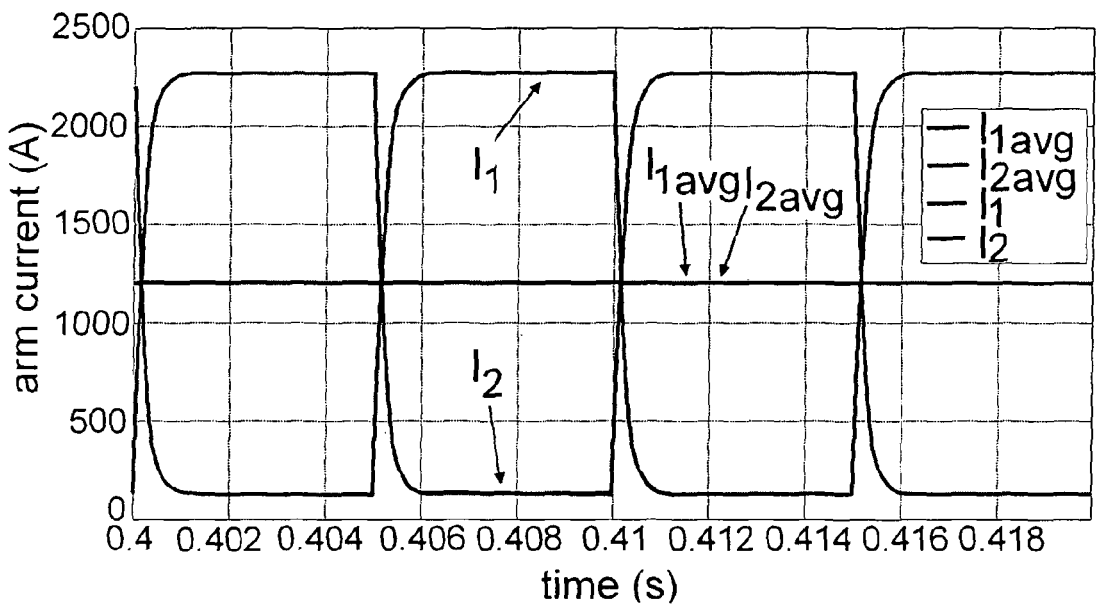

In practice, the negative value of the generated voltage waveform causes a constant DC current to flow through the current transmission path from the second DC power transmission line 28 to the first DC power transmission line 26 to compensate for any loss of energy from the first and second capacitors to the dump resistor 44. The constant DC current offsets the AC current flowing through the current transmission path to the dump resistor 44 as shown in FIG. 9b which illustrates, in graph form, the instantaneous current I1, and a zero average current I1avg in the first current transmission path portion 30 and the instantaneous current I2 and a zero average current I2avg in the second current transmission path portion 32.

Figure 9C:
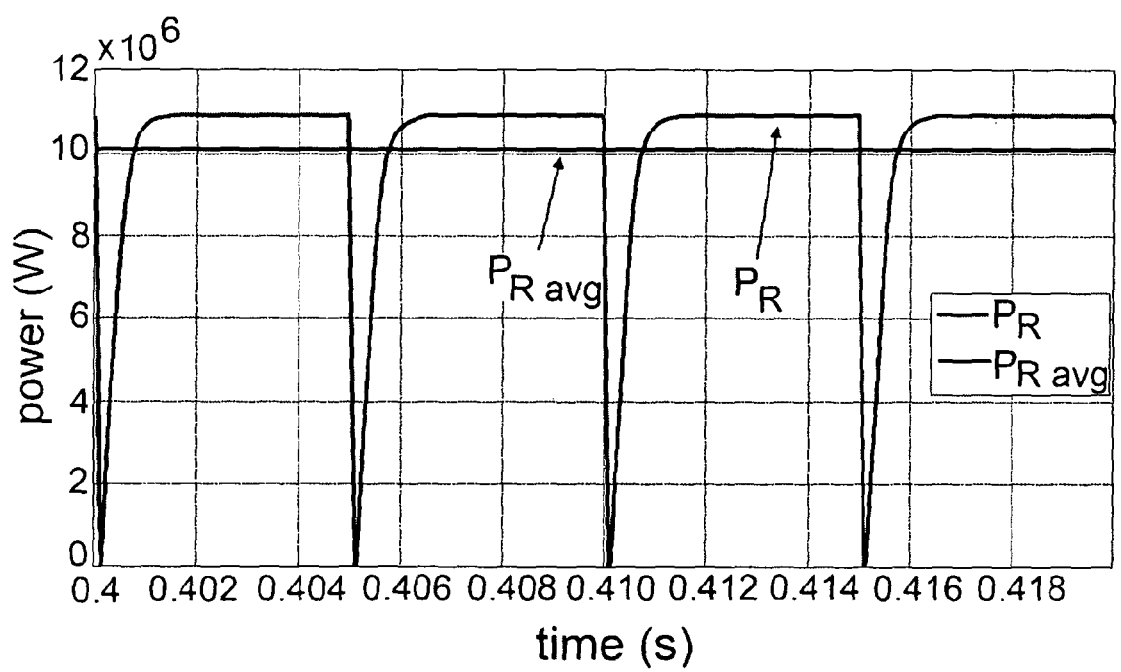

FIG. 9c shows, in graph form, the instantaneous power PR and average power PRavg dissipated in the dump resistor 44.

It was found from the simulation model that the use of a 180° phase shifted square voltage waveform across each of the first and second current transmission path portions 30,32 not only reduces the peak values of the currents through the first and second capacitors but also results in a zero net energy exchange for each of the plurality of first modules 36 and the plurality of second modules 70 in a single cycle. The use of a 180° phase shifted square voltage waveform across each of the first and second current transmission path portions 30,32 therefore results in stable operation of the fourth control circuit 320 during removal of energy from the DC power transmission lines 26,28.

Figure 10:
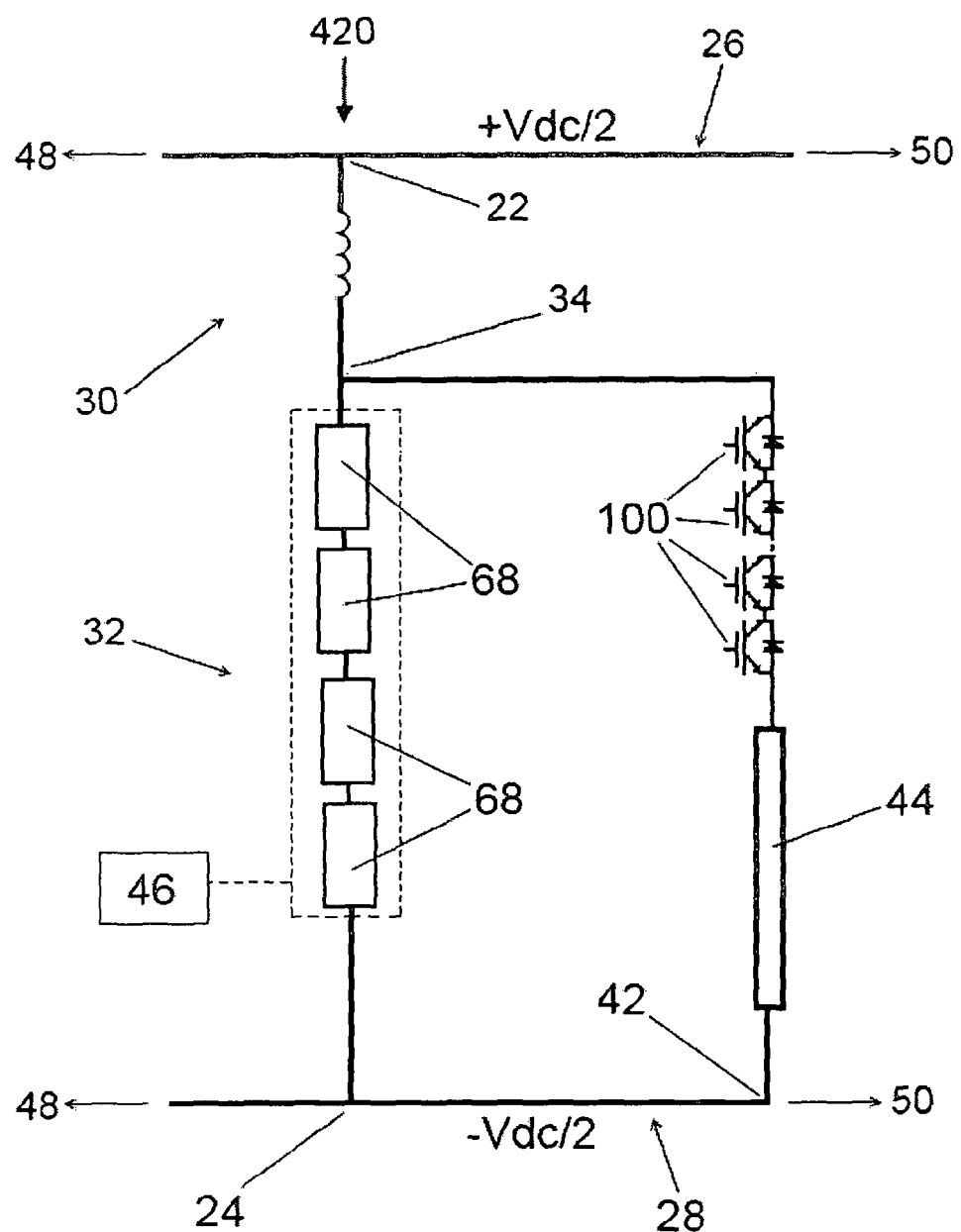
FIG. 10 shows, in schematic form, a control circuit according to a fifth embodiment of the invention.

A fifth control circuit 420 according to a fifth embodiment of the invention is shown in FIG. 10. The fifth control circuit 420 shown in FIG. 10 is similar in structure to the second control circuit 120 shown in FIG. 4, and like features share the same reference numerals.

The fifth control circuit 420 differs from the second control circuit 120 in that:
  the fifth control circuit 420 omits the plurality of first modules 36;
  the energy conversion block further includes a plurality of series-connected auxiliary switching elements 100 connected in series with the dump resistor 44.

Operation of the fifth control circuit 420 within a DC power transmission scheme is described as follows.

During normal operation the sixth control circuit 420 adopts a standby configuration in which each second capacitor is connected in the current transmission path. Meanwhile each auxiliary switching element 100 is switched to an off-state to inhibit flow of current in the dump resistor 44 to minimise energy losses.

To remove energy from the DC power transmission lines 26,28, each auxiliary switching element 100 is switched to an on-state to permit flow of current in the dump resistor 44. At this stage the control unit 46 selectively removes each second capacitor from the second current transmission path portion to modify the voltage at the third terminal 34 to allow soft-switching of each auxiliary switching element 100 when each auxiliary switching element 100 is switched to an on-state.

Switching of each auxiliary switching element 100 to an on-state causes a DC current to flow from the DC power transmission lines 26,28 through the current transmission path and into the dump resistor 44. This permits energy dissipation via the dump resistor 44 so as to remove excess energy from the DC power transmission lines 26,28.

After the DC power transmission lines 26,28 have resumed normal operation and the fifth control circuit 420 is no longer required to operated to remove energy from the DC power transmission lines 28,28, each auxiliary switching element 100 is switched back to an off-state to inhibit flow of current in the dump resistor 44 before the fifth control circuit 420 is reconfigured in its standby configuration. At this stage the control unit 46 selectively removes each second capacitor from the second current transmission path portion to modify the voltage at the third terminal 34 to allow soft-switching of each auxiliary switching element 100 when each auxiliary switching element 100 is switched back to an off-state.

In this manner the fifth control circuit 420 also provides a simpler configuration that is capable of removing energy from the DC power transmission lines 26,28.

It will be appreciated that the second current transmission path portion 32 can be configured to have a lower rating than the plurality of series-connected auxiliary switching elements 100 so as to provide reductions in terms of losses, cost and footprint. This is because selective removal of each second capacitor from the current transmission path is not essential to control the removal of energy from the DC power transmission lines 26,28.

It is envisaged that, in other embodiments of the invention, each auxiliary switching element may be replaced by an auxiliary module to control flow of current in the dump resistor, each auxiliary module including at least one auxiliary energy storage device. Preferably each auxiliary module includes at least one auxiliary switching element to selectively direct current through the or each auxiliary energy storage device or cause current to bypass the or each auxiliary energy storage device.

Each auxiliary module may be configured to have bidirectional current capability. For example, each auxiliary module may be configured to have bidirectional current capability in the same manner as the first and second modules of the current transmission path as set out above in the earlier embodiments.

Further optionally each auxiliary switching element may be replaced by an auxiliary module that is configured to have unidirectional current capability, i.e. the or each auxiliary module is configured to be capable of conducting current in only one direction. For example, each auxiliary module may include first and second sets of series-connected current flow control elements, each set of current flow control elements including an active switching element to selectively direct current through the or each auxiliary energy storage device and a passive current check element to limit current flow through the auxiliary module to a single direction, the first and second sets of series-connected current flow control elements and the or each auxiliary energy storage device being arranged in a full-bridge arrangement to define a 2-quadrant bipolar rationalised module that can provide zero, positive or negative voltage while conducting current in a single direction.

In other embodiments of the invention (not shown), it is envisaged that one or more of the switching elements may be a different switching device such as a gate turn-off thyristor, a field effect transistor, an injection-enhanced gate transistor, an integrated gate commutated thyristor or any other self-commutated semiconductor device. In each instance, the switching device is connected in parallel with an anti-parallel diode.

It is envisaged that, in other embodiments of the invention (not shown), the capacitor in each module may be replaced by a different energy storage device such as a fuel cell, a battery or any other energy storage device capable of storing and releasing its electrical energy to provide a voltage.

The invention claimed is:

1. A control circuit comprising:
   first and second terminals for respective connection to first and second power transmission lines;
   a current transmission path extending between the first and second terminals and having first and second current transmission path portions separated by a third terminal, either or both of the first and second current transmission path portions including at least one module, the or each module including at least one energy storage device,
   an auxiliary terminal for connection to ground or the second power transmission line;
   an energy conversion block for removing energy from the power transmission lines, the energy conversion block extending between the third and auxiliary terminals such that the energy conversion block branches from the current transmission path, the energy conversion block including at least one energy conversion element; and
   a control unit which selectively removes the or each energy storage device from the current transmission path.

2. The control circuit according to claim 1 wherein the control unit selectively removes the or each energy storage device from the current transmission path to cause current to flow from the power transmission lines through the current transmission path and into the or each energy conversion element to remove energy from the power transmission lines.

3. The control circuit according to claim 1 wherein the first current transmission path portion includes at least one first module, the or each first module including at least one first energy storage device.

4. The control circuit according to claim 3 wherein at least one first module includes at least one primary switching element to selectively direct current through the or each first energy storage device or cause current to bypass the or each first energy storage device.

5. The control circuit according to claim 1 wherein the second current transmission path portion includes at least one primary switching block which is switchable to selectively permit or inhibit flow of current in the second transmission path portion.

6. The control circuit according to claim 5 wherein the at least one primary switching block includes at least one secondary switching element.

7. The control circuit according to claim 5 wherein the at least one primary switching block includes a second module, the second module including at least one second energy storage device.

8. The control circuit according to claim 7 wherein the at least one second module includes at least one primary switching element to selectively direct current through the or each second energy storage device or cause current to bypass the or each second energy storage device.

9. The control circuit according to claim 5 wherein the control unit selectively switches the or each primary switching block to block or minimise current in the second current transmission path portion and thereby cause current to be directed into the or each energy conversion element.

10. The control circuit according to claim 9 wherein the at least one primary switching block includes at least one secondary switching element, and 6 wherein the control unit selectively switches the or each secondary switching element to an off-state to block current in the second current transmission path portion and thereby cause current to be directed into the or each energy conversion element.

11. The control circuit according to claim 9 wherein the at least one primary switching block includes a second module, the second module including at least one second energy storage device, wherein the at least one second module includes at least one primary switching element to selectively direct current through the or each second energy storage device or cause current to bypass the or each second energy storage device, and wherein the control unit selectively switches the or each primary switching element in the or each second module to block or minimise current in the second current transmission path portion and thereby cause current to be directed into the or each energy conversion element.

12. The control circuit according to claim 7 wherein the first current transmission path portion includes at least one first module, the or each first module including at least one first energy storage device, and wherein the control unit selectively removes each energy storage device from the first and second current transmission path portions to generate an AC voltage waveform across the or each energy conversion element to remove energy from the power transmission lines.

13. The control circuit according to claim 12 wherein the control unit selectively removes each energy storage device from the first and second current transmission path portions to generate a square voltage waveform across each of the first and second current transmission path portions and thereby generate an AC voltage waveform across the or each energy conversion element to remove energy from the power transmission lines.

14. The control circuit according to claim 1 wherein the energy conversion block further includes at least one auxiliary switching block which is switchable to selectively permit or inhibit flow of current in the or each energy conversion element.

15. The control circuit according to claim 14 wherein at least one auxiliary switching block includes at least one auxiliary switching element.

16. The control circuit according to claim 14 wherein at least one auxiliary switching block includes an auxiliary module, the auxiliary module including at least one auxiliary energy storage device.

17. The control circuit according to claim 16 wherein at least one auxiliary module includes at least one auxiliary switching element to selectively direct current through the or each auxiliary energy storage device or cause current to bypass the or each auxiliary energy storage device.

18. The control circuit according to claim 14 wherein the second current transmission path portion includes at least one primary switching block which is switchable to selectively permit or inhibit flow of current in the second transmission path portion, wherein at least one primary switching block includes a second module, the second module including at least one second energy storage device, and wherein the control unit selectively removes each second energy storage device from the second current transmission path portion to modify the voltage at the third terminal to allow soft-switching of the or each auxiliary switching block when the or each auxiliary switching block is switched.

* * * * *